United States Patent [19]
Reed

[11] Patent Number: 5,605,449
[45] Date of Patent: Feb. 25, 1997

[54] SUCTION AND DISCHARGE VALVE ARRANGEMENT FOR A HIGH PRESSURE PISTON PUMP

[75] Inventor: Glen E. Reed, Houston, Tex.

[73] Assignee: Wendy Buskop, Houston, Tex.

[21] Appl. No.: 590,017

[22] Filed: Jan. 25, 1996

[51] Int. Cl.⁶ .............................. F04B 53/10; F16K 15/00
[52] U.S. Cl. .......................... 417/454; 417/567; 417/571; 137/454.4; 137/512; 137/543.23
[58] Field of Search ..................................... 417/454, 567, 417/569, 571; 137/512, 454.4, 543.23

[56] References Cited

U.S. PATENT DOCUMENTS

| | | | |
|---|---|---|---|
| 3,811,801 | 5/1974 | Buse et al. | 417/539 |
| 4,551,077 | 11/1985 | Pacht | 417/454 |
| 5,230,363 | 7/1993 | Winn, Jr. et al. | 417/571 |

FOREIGN PATENT DOCUMENTS

| | | | |
|---|---|---|---|
| 3003869 | 8/1981 | Germany | 417/571 |
| 392758 | 10/1965 | Switzerland | 417/571 |

*Primary Examiner*—Timothy Thorpe
*Assistant Examiner*—Roland G. McAndrews, Jr.
*Attorney, Agent, or Firm*—Chamberlain, Hrdlicka et al.

[57] ABSTRACT

There is provided a fluid side of a high pressure water pump is to be used with a pump having a power side which has at least one piston and at least one stuffing box. The fluid side consists of a unitary substantially block shaped fluid end which defines a generally cylindrical fluid inlet bore, a generally cylindrical fluid outlet bore, and at least one generally cylindrical working bore. The working bore intersects the fluid inlet bore and the fluid outlet bore. Within each working bore there is sealably provided a substantially tubular suction/discharge seat which has a longitudinal axis, a suction end, a discharge end, an outside surface extending between the suction end and the discharge end, and an inside surface extending between the suction end and the discharge end. The suction/discharge seat defines a plurality of fluid holes at the suction end which provide a flow path of a fluid from the fluid inlet bore to the inlet end of the fluid end. There is provided a suction valve linearly movable within the working bore and positioned near an inlet end of the working bore. Also provided is a discharge valve linearly movable within the working bore. An end plug is removably positioned in an outlet end of the working bore. A suction valve stop is positioned between the suction valve and the inlet end of the working bore and a discharge valve stop is positioned in the working bore between the discharge valve and the end plug. An insertion/removal tool may be used to insert/remove all components from the at least one working bore in a single step.

14 Claims, 3 Drawing Sheets

SUCTION AND DISCHARGE VALVE ARRANGEMENT FOR A HIGH PRESSURE PISTON PUMP

BACKGROUND OF THE INVENTION

This invention pertains to a water pump, in particular the fluid side of a high pressure water pump.

High pressure water pumps are known in the art. The pumps are used in industrial applications for surface preparation before applying coatings and the like. Also, the pump are used to clean surfaces, such as rubber off runways or oil slicks.

Most high pressure water pumps have at least two manifolds in the fluid side, a suction manifold and a discharge manifold. This makes the pumps large and difficult to seal, as the manifolds must be forced together under torque. If the sealing surface of a manifold gets damaged during use, transport or repair, the manifold must be refaced before the pump can be put back into service. A fluid side for a high pressure pump that is more compact and easy to seal without special torquing tools would be desirable.

One of the reasons existing high pressure water pumps are large is that large suction/discharge seats are required to move the water under pressure. A compact suction/discharge seat which can meet standard high pressure pump specifications would be very desirable.

Because high pressure water pumps contain multiple manifolds, machining can be difficult as not only must all the bores line up when assembled, but the sealing faces of the manifolds must be smooth and flat. A fluid side that is easier to machine and align would be desirable.

High pressure water pumps contain many parts, which must be removed for maintenance and many times replaced. A pump which contained fewer parts and which could be assembled and disassemble with a minimum of steps would be very desirable.

OBJECTS OF THE INVENTION

It is an object of the invention to provide a high pressure water pump with a single manifold, negating the need to torque manifolds together to maintain pressure.

It is further an object of the invention to provide a high pressure water pump with fewer parts than the conventional water pump.

It is still further an object of the invention to provide a high pressure water pump that is smaller than conventional pumps with the same ratings.

It is another object of the invention to provide a high pressure water pump that is easy to machine.

It is yet another object of the invention to provide a high pressure water pump that has reduced internal stresses, lowering the risk of stress risers which may start cracking during use.

It is still another object of the invention to provide a lower surface area high pressure water pump with high efficiency.

It is yet another object of the invention to provide a high pressure water pump that can be assembled/disassembled in one to two steps, with minimal tools and in minimal time.

It is still yet an object of the invention to provide a high pressure water pump that can be subjected to autofrettage and thus prestressed to run under duty at high load.

SUMMARY OF THE INVENTION

In one embodiment of the invention there is provided a fluid side of a high pressure water pump. The fluid side is to be used with a pump having a power side which has at least one piston and at least one stuffing box. The fluid side consists of a unitary substantially block shaped fluid end which defines a generally cylindrical fluid inlet bore, a generally cylindrical fluid outlet bore, and at least one generally cylindrical working bore. The working bore intersects the fluid inlet bore and the fluid outlet bore. Within each working bore there is sealably provided a substantially tubular suction/discharge seat which has a longitudinal axis, a suction end, a discharge end, an outside surface extending between the suction end and the discharge end, and an inside surface extending between the suction end and the discharge end. The suction/discharge seat further comprises a first outside surface having a first end at the suction end of the suction/discharge seat, and a second end, a second outside surface having a first end adjacent to the second end of the first outside surface, and a second end, a third outside surface having a first end adjacent to the second end of the second outside diameter, and a second end at the discharge end of the suction/discharge seat, a first annular shoulder joining the first outside surface with the second outside surface, a second annular shoulder joining the second outside surface with the third outside surface, and an inside surface extending from the inlet end to the outlet end. The first outside surface defines a first outside diameter, the second outside surface defines a second outside diameter smaller than the first outside diameter and the third outside surface defines a third outside diameter substantially similar to the first outside diameter. The inside surface defines an inside diameter. There is provided a first seating surface at the suction end and a second seating surface at the discharge end. The suction/discharge seat defines a plurality of fluid holes at the suction end. These fluid holes provide a flow path of a fluid from the fluid inlet bore to the inlet end of the fluid end. There is provided a suction valve linearly movable within the working bore and positioned near an inlet end of the working bore. Also provided is a discharge valve linearly movable within the working bore. An end plug is removably positioned in an outlet end of the working bore. A suction valve stop is positioned between the at suction valve and the inlet end of the working bore and a discharge valve stop is positioned in the working bore between the discharge valve and the end plug. A suction spring is provided between the suction valve stop and the one suction valve. This spring tends to bias the suction valve against the suction/discharge seat. A discharge spring is provided between the discharge valve stop and the discharge valve. This spring tends to bias the discharge valve against the suction/discharge seat. Finally, there is provided a means for removably fastening the fluid end to the power side, wherein the at least one working bore is in line with the at least one piston and at least one stuffing box and the inlet end of the at least one working bore is attached to an end of the at least one stuffing box. When assembled, the outside surface of the suction/discharge seat is in contact with the fluid inlet bore and, further, the suction/discharge seat segregates file intersection of the fluid inlet bore and the working bore from the intersection of the fluid outlet bore and the working bore. An insertion/removal tool may be used to insert/remove all components from the at least one working bore in a single step.

DETAILED DESCRIPTION OF THE PREFERRED EMBODIMENTS

Figure 1:
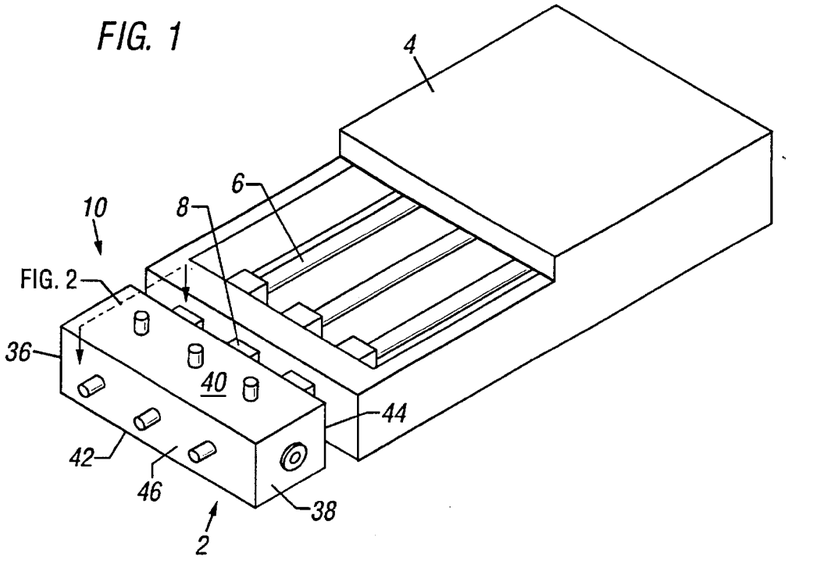
FIG. 1 is a schematic representation of the high pressure water pump including the fluid side of the invention.
Figure 2:
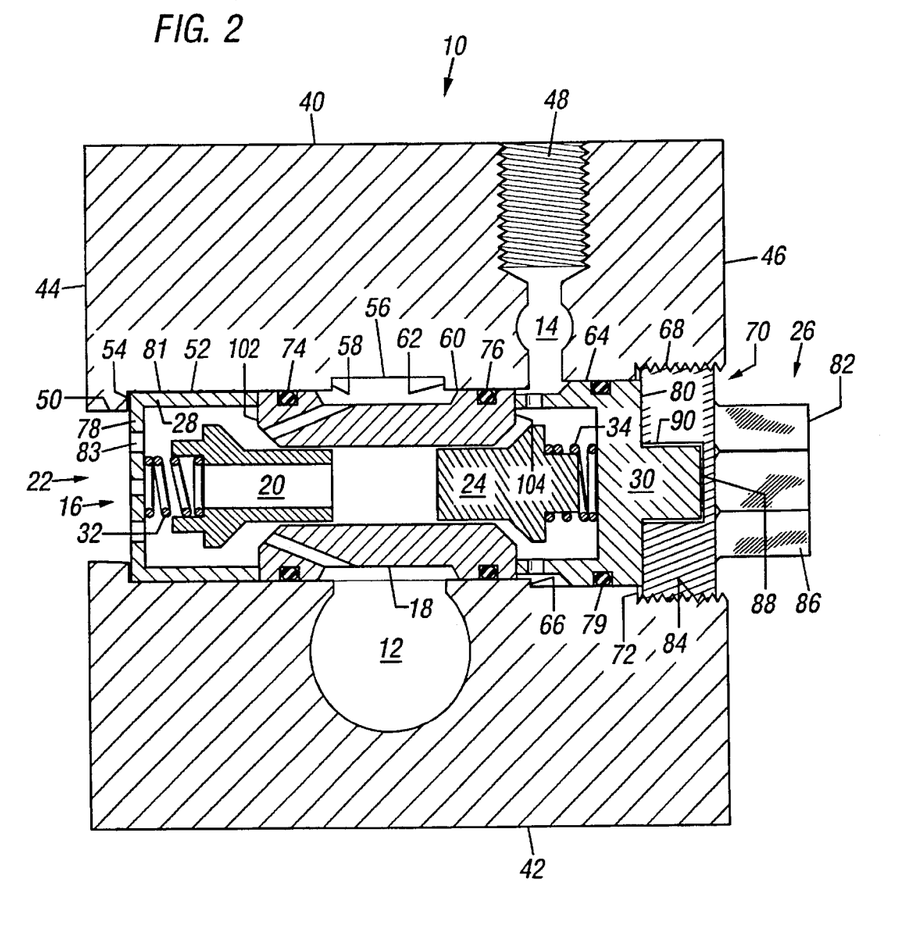
FIG. 2 is a cross-section view through a working bore showing the invention as assembled.

Referring to FIG. 1 and FIG. 2, in one embodiment of the invention there is provided a fluid side 2 of a high pressure water pump. The fluid side is to be used with a pump having a power side 4 which has at least one piston 6 and at least one stuffing box 8. The fluid side comprises a unitary substantially block shaped fluid end 10 defining a generally cylindrical fluid inlet bore 12, a generally cylindrical fluid outlet bore 14, and at least one generally cylindrical working bore 16 intersecting the fluid inlet bore 12 and the fluid outlet bore 14. The fluid end 10 has a first end 36, a second end 38, a top surface 40, a bottom surface 42, a first side 44 and a second side 46. The fluid inlet bore 12, which extends from the first end 36 to the second end 38 of the fluid end 10, has a longitudinal axis and a substantially cylindrical inside surface. The fluid outlet bore 14 also has a longitudinal axis and a substantially cylindrical inside surface and also extends from the first end 36 to the second end 38 of the fluid end 10. The working bore 16 has a longitudinal axis and at least one substantially cylindrical inside surface. The working bore extends from the first side 44 to the second side 46 of the fluid end 10.

Each working bore contains one substantially tubular suction/discharge seat 18 sealably positioned in the at least one working bore 16. A suction valve 20, positioned near the inlet end 22 of the at least one working bore 16, is linearly movable within the working bore. A discharge valve 24 is also linearly movable within the working bore. An end plug 26 is removably positioned in an outlet end 70 of the working bore. A suction valve stop 28 is positioned in the working bore between the suction valve 20 and the inlet end 22 of the working bore. A discharge valve stop 30 is positioned in the working bore between the discharge valve 24 and the end plug 26. A suction spring 32 is placed between the suction valve stop 28 and the suction valve 20. This suction spring has a first end and a second end and defines an outside diameter. The suction spring has the characteristic of biasing the suction valve 20 against the suction/discharge seat 18. However, the suction spring is of a strength that allows flow of the fluid from the fluid inlet bore 12 to the inlet end 22 of the working bore during the suction stroke of the piston 6. A discharge spring 34 is placed between the discharge valve stop 30 and the discharge valve 24. This discharge spring has a first end and a second end and defines an inside diameter. The discharge spring has the characteristic of biasing the discharge valve 24 against the suction/discharge seat 18. Like the suction spring, the discharge spring is of a strength that allows flow from the suction discharge seat to the working bore during the discharge stroke of the piston. Finally, there is provided a means for removably fastening the fluid end to the power side, wherein the at least one working bore is in line with the at least one piston 6 and at least one stuffing box 8 and the inlet end 22 of the at least one working bore 16 is attached to an end of the at least one stuffing box 8.

When properly assembled, the second outside surface 110 of the at least one suction/discharge seat 18 is in contact with the fluid inlet bore 12. The at least one suction/discharge seat 18 segregates the intersection of the fluid inlet bore 12 and the working bore 16 from the intersection of the fluid outlet bore 14 and the at least one working bore 16. The components are all aligned within the working bore, allowing an insertion/removal tool to be used to insert/remove all components from the at working bore in a single step.

In a preferred embodiment, the fluid end further comprises at least one substantially cylindrical gauge bore 48 having a longitudinal axis and a substantially cylindrical inside surface. The at least one gauge bore extends from the at least one working bore 16 to the top surface 40 of the fluid end 10 and intersects the fluid outlet bore 14. The at least one gauge bore 48 has a second end at the top surface 40 of the fluid end 10. This second end has a means for removably plugging the at least one gauge bore. Typically, the means for removably plugging is a standard thread and either a high pressure plug or a gauge is threaded into the gauge bore. However, the one piece fluid end is capable of being subjected to an autofrettage treatment and it is expected that the gauge bores in a fluid end which has been autofrettaged will have autoclave fittings instead of standard thread fittings. Autofrettage, which is a prestressing treatment which takes place at high internal pressures, will allow the pump to be run under duty at high load.

Preferably, the working bore has a stepped profile. There is a first inside surface 50 having a first end at the inlet end 22 and a second end, a second inside surface 52 having a first end adjacent to the second end of the first inside diameter, a third inside surface 56 having a first end adjacent to the second end of the second inside surface 52, a fourth inside surface 60 having a first end adjacent to the second end of the third inside surface 56 and a second end, a fifth inside surface 64 having a first end a first end adjacent to the second end of the fourth inside surface 60 and a second end, and a sixth inside surface 68 having a first end adjacent to the second end of the fifth inside surface 64 and a second end at the outlet end 70 of the working bore. The first inside surface defines a first inside diameter, the second inside surface defines a second inside diameter greater than the first inside diameter, the third inside surface defines a third inside diameter greater than the second inside diameter, the fourth inside surface defines a fourth inside diameter substantially similar to the second inside diameter, the fifth inside surface defines a fifth inside diameter greater than the fourth inside diameter, and the sixth inside surface defining a sixth inside diameter greater than the fifth inside diameter. Further, the third inside surface intersects the fluid inlet bore 12 and the fifth inside surface intersects the fluid outlet bore 14. The sixth inside surface has a means for removably attaching the at least one end plug 26 at the second end of the sixth inside surface. A first annular shoulder 54 joins the first inside surface 50 with the second inside surface 52, a second annular 58 shoulder joins the second inside surface 52 with the third inside surface 56, a third annular shoulder 62 joins the third inside surface 56 with the fourth inside surface 60, a fourth annular shoulder 66 joins the fourth inside surface 60 with the fifth inside surface 64, and a fifth annular shoulder 72 joins the fifth inside surface with the sixth inside surface.

Figure 3:
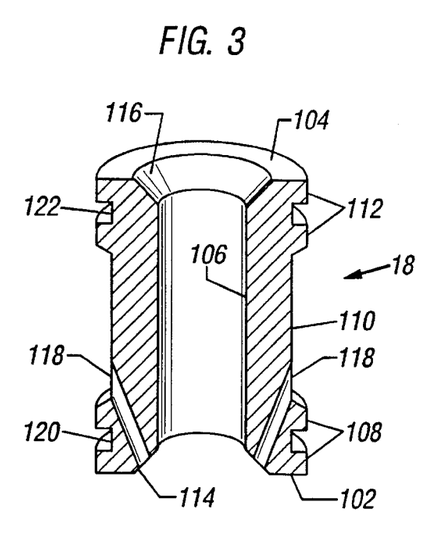
FIG. 3 is a cross-sectional view of the suction/discharge seat of the present invention.

Referring to FIG. 2 and FIG. 3, the suction/discharge seat 18 has a longitudinal axis, a suction end 102, a discharge end 104, an outside surface extending between the suction end and the discharge end, and an inside surface 106 extending between the suction end and the discharge end. In detail, the at least one substantially tubular suction/discharge seat comprises a first outside surface 108 having a first end at the suction end 102 of the suction/discharge seat, and a second end, a second outside surface 110 having a first end adjacent to the second end of the first outside surface, and a second end, and a third outside surface 112 having a first end adjacent to the second end of the second outside diameter, and a second end at the discharge end 104 of the suction/ discharge seat. The first outside surface defines a first outside diameter, the second outside surface defines a second outside diameter smaller than the first outside diameter and the third outside surface defines a third outside diameter substantially similar to the first outside diameter. The first outside surface and second outside surface are joined by a first annular shoulder. A second annular shoulder joins the second outside surface with the third outside surface. The first outside surface 108 and the third outside surface 112 each further define a first circumferential groove 120 and a second circumferential groove 122 positioned in the first outside surface and the third outside surface respectively. A first o-ring 74 is positioned in the first circumferential groove and a second o-ring 76 is positioned in the second circumferential groove. It has been found that an o-ring of high durometer (approximately 90) works well. The o-rings work to both position the suction/discharge seat in the working bore and to segregate fluid communication from the intersection of the fluid inlet bore and the working bore to the intersection of the fluid outlet bore and the working bore. An inside surface 106 extends from near the inlet end 102 to the near the outlet end 104. The inside surface defines an inside diameter. A first seating surface 114 is located at the suction end and a second seating surface 116 is located at the discharge end. The suction/discharge seat defines a plurality of fluid holes 118 at the suction end. These fluid holes provide a flow path of a fluid from the fluid inlet bore 12 to an inlet end 22 of the working bore 16. When assembled in the working bore, the longitudinal axis of the suction/ discharge seat is coaxial with the longitudinal axis of the working bore.

Referring again to FIG. 2, the at least one suction valve stop 28 is substantially can shaped and has a longitudinal axis, a bottom end 78, an open second end and a generally tubular sidewall. The sidewall has an outside surface 81 connecting the bottom end and the second end and an inside surface defining an inside diameter. The bottom end defines a plurality of holes 83 providing a flow path of a fluid from the working bore 16 to the stuffing box 8. The bottom hole may also have a threaded, centrally located hole to facilitate assembled/removal of the assembly. It has been found that use of a ⅜" threaded hole works well with a ⅜" all-thread rod insertion/removal tool. The outside surface 81 of the suction valve defines an outside diameter similar to the second inside diameter of the working bore. When assembled, the outside surface 81 is coincident with the second inside surface 52 of the working bore and the longitudinal axis of the suction valve stop is coaxial with the longitudinal axis of the working bore.

Figure 4:
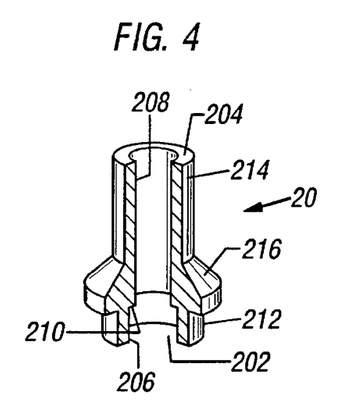
FIG. 4 is a cut-away view of the suction valve of the present invention.

The suction valve is seen in FIG. 4. The at least one suction valve 20 is substantially tubular with a first end 202, a second end 204, a multi-stepped inside surface and a multi-stepped outside surface. The inside surface comprises first generally cylindrical inside surface 206 having a first end at the first end of the suction valve and a second end, a generally cylindrical second inside surface 208 having a first end adjacent to the second end of the first inside surface 206 and a second end at the second end 204 of the suction valve and an annular shoulder 210 joining the first inside surface and the second inside surface. The first inside surface defines a first inside diameter similar to the outside diameter of the suction spring 32 and the second inside surface defines an inside diameter smaller than the first inside diameter. The outside surface comprises a first generally cylindrical outside surface 212 having a first end at the first end 202 of the suction valve and a second end, a second generally cylindrical outside surface 214 having a first end, and a second end at the second end 204 of the suction valve, and a seating surface 216 joining the second end of the first outside surface 212 and the first end of the second outside surface 214. The seating surface has the characteristic of seating against the suction end 102 of the suction/discharge seat 18 during a forward stroke of the at least one piston 6, thereby stopping fluid flow from the fluid inlet bore 12 to the inlet end 22 of the working bore. The first outside surface defines a first outside diameter larger than the inside diameter of the suction/discharge seat 18 and the second outside surface defines a second outside diameter smaller than the first outside diameter and smaller than the inside diameter of the suction/discharge seat 18. When assembled in the working bore, the first inside diameter is in covering relationship to the outside diameter of the suction spring 32 and the second end of the suction spring is adjacent to the annular shoulder 210, the longitudinal axis of the suction valve is coaxial with the longitudinal axis of the working bore, and the inside surface of the suction valve stop 28 is in covering relationship with at least a portion of the suction valve during stoking of the pump.

Figure 5:
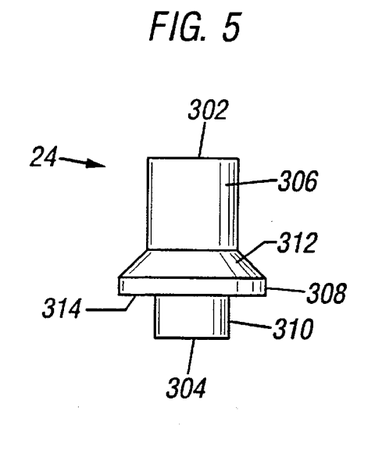
FIG. 5 is a planar view of the discharge valve of the present invention.

Referring to FIG. 5, the at least one discharge valve 24 is substantially cylindrical and comprises a first end 302 and a second end 304. There is a first generally cylindrical outside surface 306 having a first end at the first end 302 of the discharge valve and a second end, a second generally cylindrical outside surface 308 having a first end and a second end and a third generally cylindrical outside surface 310 having a first end adjacent to the second end of the second outside surface 308 and a second end at the second end 304 of the discharge valve. The first outside surface defines a first outside diameter smaller than the inside diameter of the suction/discharge seat 18, the second outside surface defines a second outside diameter larger than the inside diameter of the suction/discharge seat 18, and the third outside surface defining a third outside diameter similar to the inside diameter of the discharge spring 34. A seating surface 312 joins the second end of the first outside surface 306 and the first end of the second outside surface 308. The seating surface has the characteristic of seating against the discharge end 104 of the suction/discharge seat 18 during a backward stroke of the at least one piston, thereby stopping fluid from the suction/discharge seat 18 to the fluid outlet bore 14. The second and third outside surfaces are joined by an annular shoulder 314. When assembled, the inside diameter of the discharge spring 34 is in covering relationship to the third outside diameter 310 and the first end of the discharge spring is adjacent to the annular shoulder 314 and the longitudinal axis of the discharge valve is coaxial with the longitudinal axis of the working bore.

Figure 6:
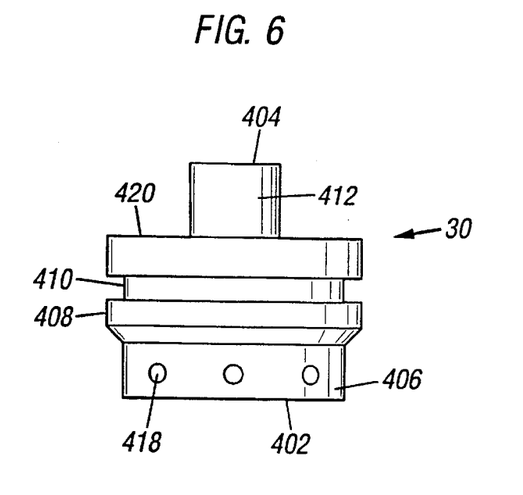
FIG. 6 is a planar view of the discharge valve stop of the present invention.
Figure 7:
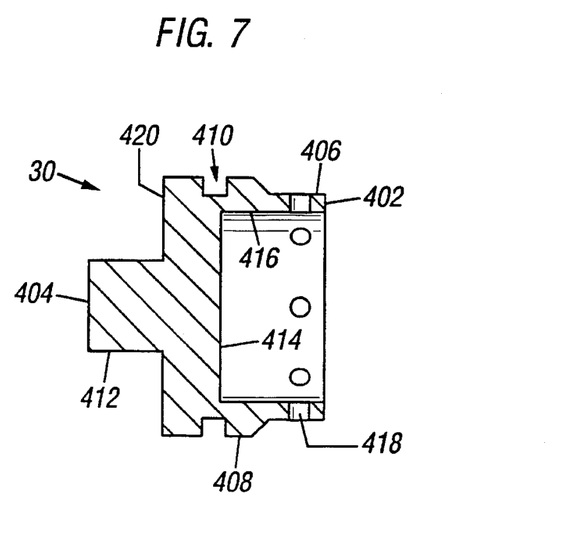
FIG. 7 is a cross-sectional view of the discharge valve stop of the present invention, showing the cut-out.

FIG. 6 and FIG. 7 show the discharge valve stop 30. The at least one discharge valve stop comprise a longitudinal axis, an open first end 402, a second end 404 and inside and outside surfaces. The outside surface comprises a generally cylindrical first outside surface 406 having a first end at the first end 402 of the discharge valve stop, a generally cylindrical second outside surface 408 having a first end and a second end, and a generally cylindrical third outside surface 4 12 having a first end adjacent to the second end of the second outside surface 408. The second outside surface defines a circumferential groove 410 positioned in the second outside surface. An o-ring 79 is placed in the groove to both seat the discharge valve in the working bore and segregate the discharge area from the end plug area. The first outside surface 406 defines a first outside diameter, the second outside surface defines a second outside diameter greater than the first outside diameter and similar to and coincident with the fifth inside diameter 64 of the working bore 16, and the third outside surface defines a third outside diameter. A shoulder joins the second end of the first outside surface 406 and the first end of the second outside surface 408. This should may be beveled. The second outside surface 408 with the third outside surface 412 are joined by an annular shoulder 420. The discharge valve stop has a substantially can-shaped cut-out in the first end 402. The cut-out has a closed bottom surface 414 and a generally tubular sidewall having an inside surface 416 connecting the first end 402 and the bottom surface 414. The inside surface defines an inside diameter substantially greater than the second outside surface 308 of the discharge valve 24. The tubular sidewall of the cut-out defines a plurality of holes 418 providing a flow path of a fluid from the working bore 16 to the fluid outlet bore 14. When assembled in the working bore, the inside surface of the discharge valve stop cutout is in covering relationship with at least a portion of the discharge valve during stoking of the pump and the longitudinal axis of the discharge valve stop is coaxial with the longitudinal axis of the working bore.

Referring again to FIG. 1, the at least one end plug comprises a first end 80, a second end 82, a first outside surface 84 having a first end at the first end 80 of the end plug and a second end, and a second outside surface 86 having a first end adjacent to the second end of the first outside surface 84 and a second end at the second end 82 of the end plug. The first outside surface defines a first outside diameter similar to the sixth inside diameter of the working bore. The first outside surface 84 also defines a means for engagably attaching to the sixth inside surface 68 of the working bore. Standard machine thread have worked well. The second outside surface defines a second outside diameter smaller than the first outside diameter. The second outside diameter further defines a means for wrench attachment. A hex head which can hold a crescent wrench has been found to work well. The first end of the end plug defines a substantially can-shaped cut-out having a closed bottom surface 88 and a generally tubular sidewall. The sidewall has an inside surface 90 connecting the first end 80 and the bottom surface 88. This inside surface defines an inside diameter similar to the third outside surface 412 of the discharge valve stop 30. When assembled in the working bore, the inside surface 90 of the end plug cut-out is coincident with and in covering relationship with the third outside surface 412 of the discharge valve stop. The end plug 26 is movably adjustable within the working bore 16 and is used as the means for seating all the components. During assembly, the end plug is tightened with a crescent wrench until the plug no longer moves. At this point the bottom end 78 of the suction valve stop 28 is coincident with the first annular shoulder 54 of the working bore 16, the first end 102 of the suction/discharge seat 18 is coincident with the second end of the suction valve stop 28, the first end 402 of the discharge valve stop 30 is coincident with the second end 104 of the suction/discharge seat 18, the first end 80 of the end plug 26 is coincident with the annular shoulder 420 of the discharge valve stop 30, and the bottom surface 88 of the end plug cut-out is coincident with the second end 404 of the discharge valve stop 30. It is not necessary to use a torque wrench to ensure a proper seal. When assembled in the working bore, the longitudinal axis of the end plug is coaxial with the longitudinal axis of the working bore.

In a preferred embodiment of the invention, the bottom end 78 of the suction valve stop 28 contains a centrally located taped and threaded hole which can accept an insertion/removal tool. To disassemble the pump, the end plug, discharge valve stop, discharge spring and discharge valve are removed and the insertion/removal tool is be inserted through the suction/discharge seat, suction seat, and suction spring. The tool is then attached to the threaded hole in the suction valve stop and pulled out, bringing the suction/discharge seat, suction seat, suction spring and suction valve stop with it. The process is reversed to assemble the tool. It has been found that a ⅜" all-thread rod works well as an insertion/removal tool and the suction valve stop is threaded accordingly. Use of the tool has resulted in workers being able to break-down the fluid end, clean parts and/or change o-rings, and reassemble the pump in less than 15 minutes. The components of the present invention result in a fluid side which is quite compact. For example, when the fluid side is rated for 15,000 pounds and 10 gallons/minute, the suction/discharge seat is about 2.50 inches long and about 1.48 inches in diameter, the fourth inside diameter of the working bore is about 1.50 inches and the working bore is about 6.50 inches long. These sizes will varying with the rating of the pump.

The working bore of the invention is fairly simply to machine. The internal edges may be beveled so that they can be polished, eliminating stress risers at the corners. The major cause of cracking and leaks in high pressure water pumps is cracking which originates at sharp internal corners. The working bore also results in a smaller cavity size, thus there is a smaller surface area. It is believed that this will increase the efficiency of the pump. Finally, because the gauge holes connect directly with the working bore, as opposed to many pumps where the discharge holes are cut offset from the working bore and into the outlet bore only, the stresses on the fluid end should be reduced, resulting in a stronger pump.

I claim:

1. A fluid side of a high pressure water pump, said fluid side to be used with a pump having a power side having at least one piston and at least one stuffing box, said fluid side comprising:

a unitary substantially block shaped fluid end defining a generally cylindrical fluid inlet bore, a generally cylindrical fluid outlet bore, and at least one generally cylindrical working bore intersecting said fluid inlet bore and said fluid outlet bore;

at least one substantially tubular suction/discharge seat sealably positioned in the at least one working bore, said suction/discharge seat having a longitudinal axis, a suction end, a discharge end, an outside surface extending between the suction end and the discharge end, and an inside surface extending between the suction end and the discharge end, said at least one substantially tubular suction/discharge seat further comprising a first outside surface having a first end at the suction end of the suction/discharge seat, and a second end, said first outside surface defining a first outside diameter, a second outside surface having a first end adjacent to the second end of the first outside surface, and a second end, said second outside surface defining a second outside diameter smaller than the first outside diameter, a third outside surface having a first end adjacent to the second end of the second outside diameter, and a second end at the discharge end of the suction/discharge seat, said third outside surface defining a third outside diameter substantially similar to the first outside diameter, a first annular shoulder joining the first outside surface with the second outside surface, a second annular shoulder joining the second outside surface with the third outside surface, an inside surface extending from near the inlet end to the near the outlet end, said inside surface defining an inside diameter, a first seating surface located at the suction end, and a second seating surface located at the discharge end, wherein said suction/discharge seat defines a plurality of fluid holes at the suction end, said fluid holes providing a flow path of a fluid from the fluid inlet bore to the inlet end of the fluid end;

at least one suction valve element linearly movable within said at least one working bore and positioned near an inlet end of the at least one working bore;

at least one discharge valve element linearly movable within said at least one working bore;

at least one end plug removably positioned in an outlet end of the at least one working bore, said end plug having an outside diameter which is greater than the inside diameter of the working bore, a first end, and a second end and is used as the means for seating the tubular suction/discharge seat;

at least one suction valve element stop positioned in the at least one working bore between the at least one suction valve element and the inlet end of said working bore;

at least one discharge valve dement stop positioned in the at least one working bore between the at least one discharge valve element and the at least one end plug;

at least one suction spring between said at least one suction valve element stop and said at least one suction valve element, said at least one suction spring having a first end and a second end and defining an outside diameter, said suction spring having the characteristic of biasing said at least one suction valve element against said at least one suction/discharge seat;

at least one discharge spring between said at least one discharge valve element stop and said at least one discharge valve dement, said at least one discharge spring having a first end and a second end and defining an inside diameter, said at least one discharge spring having the characteristic of biasing said at least one discharge valve element against said at least one suction/discharge seat; and a means for removably fastening said fluid end to said power side, wherein the at least one working bore is in line with the at least one piston and at least one stuffing box and the inlet end of said at least one working bore is attached to an end of the at least one stuffing box; and wherein the second outside surface of the at least one suction/discharge seat is in contact with the fluid inlet bore and wherein the at least one suction/discharge seat further segregates the intersection of the fluid inlet bore and the working bore from the intersection of the fluid outlet bore and the at least one working bore.

2. The apparatus of claim 1 wherein the fluid end has a first end, a second end, a top surface, a bottom surface, a first side and a second side;

the fluid inlet bore has a longitudinal axis and a substantially cylindrical inside surface, said fluid inlet bore extending from the first end to the second end of the fluid end;

the fluid outlet bore has a longitudinal axis and a substantially cylindrical inside surface, said fluid outlet bore extending from the first end to the second end of the fluid end; and the working bore has a longitudinal axis and at least one substantially cylindrical inside surface, and working bore extending from the first side to the second side of the fluid end.

3. A fluid side of a high pressure water pump, said fluid side to be used with a pump having a power side having at least one piston and at least one stuffing box, said fluid side comprising:

a unitary substantially block shaped fluid end defining a generally cylindrical fluid inlet bore, a generally cylindrical fluid outlet bore, and at least one generally cylindrical working bore intersecting said fluid inlet bore and said fluid outlet bore;

at least one substantially tubular suction/discharge seat sealably positioned in the at least one working bore, said suction/discharge seat having a longitudinal axis, a suction end, a discharge end, an outside surface extending between the suction end and the discharge end, and an inside surface extending between the suction end and the discharge end, said at least one substantially tubular suction/discharge seat further comprising a first outside surface having a first end at the suction end of the suction/discharge seat, and a second end, said first outside surface defining a first outside diameter, a second outside surface having a first end adjacent to the second end of the first outside surface, and a second end, said second outside surface defining a second outside diameter smaller than the first outside diameter;

a third outside surface having a first end adjacent to the second end of the second outside diameter, and a second end at the discharge end of the suction/discharge seat, said third outside surface defining a third outside diameter substantially similar to the first outside diameter, a first annular shoulder joining the first outside surface with the second outside surface, a second annular shoulder joining the second outside surface with the third outside surface, an inside surface extending from near the inlet end to the near the outlet end, said inside surface defining an inside diameter, a first seating surface located at the suction end, and a second seating surface located at the discharge end, wherein said suction/discharge seat defines a plurality of fluid holes at the suction end, said fluid holes providing flow path of a fluid from the fluid inlet bore to the inlet end of the fluid end;

at least one suction valve element linearly movable within said at least one working bore and positioned near an inlet end of the at least one working bore;

at least one discharge valve element linearly movable within said at least one working bore:

at least one end plug removably positioned in an outlet end of the at least one working bore;

at least one suction valve element stop positioned in the at least one working bore between the at least one suction valve element and the inlet end of said working bore;

at least one discharge valve element stop positioned in the at least one working bore between the at least one discharge valve element and the at least one end plug;

at least one suction spring between said at least one suction valve element stop and said at least one suction valve element, said at least one suction spring having a first end and a second end and defining an outside diameter, said suction spring having the characteristic of biasing said at least one suction valve element against said at least one suction/discharge seat;

at least one discharge spring between said at least one discharge valve element stop and said at least one discharge valve element, said at least one discharge spring having a first end and a second end and defining an inside diameter, said at least one discharge spring having the characteristic of biasing said at least one discharge valve element against said at least one suction/discharge seat; and a means for removably fastening said fluid end to said power side, wherein the at least one working bore is in line with the at least one piston and at least one stuffing box and the inlet end of said at least one working bore is attached to an end of the at least one stuffing box; and wherein the second outside surface of the least one suction/discharge seat is in contact with the fluid inlet bore and wherein the at least one suction/discharge seat further segregates the intersection of the fluid inlet bore and the working bore from the intersection of the fluid outlet bore and the at least one working bore;

wherein the fluid end has a first end, a second end, a top surface, a bottom surface, a first side and a second side;

the fluid inlet bore has a longitudinal axis and a substantially cylindrical inside surface, said fluid inlet bore extending from the first end to the second end of the fluid end;

the fluid outlet bore longitudinal axis and a substantially cylindrical inside surface, said fluid outlet bore extending from the first end to the second end of the fluid end; and the working bore has a longitudinal axis and at least one substantially cylindrical inside surface, said working bore extending from the first side to the second side of the fluid end;

said apparatus further comprising at least one substantially cylindrical gauge bore having a longitudinal axis and a substantially cylindrical inside surface, said at least one gauge bore extending from said at least one working bore to the top surface of the fluid end, said at least one gauge bore further intersecting said fluid outlet bore.

4. The apparatus of claim 3 wherein the at least one working bore further comprises a first inside surface having a first end at the inlet end and a second end, said first inside surface defining a first inside diameter;

a second inside surface having a first end adjacent to the second end of the first inside diameter, said second inside surface defining a second inside diameter greater than the first inside diameter;

a first annular shoulder joining the first inside surface with the second inside surface;

a third inside surface having a first end adjacent to the second end of the second inside surface, said third inside surface defining a third inside diameter greater than the second inside diameter, said third inside surface further intersecting said fluid inlet bore;

a second annular shoulder joining the second inside surface with the third inside surface;

a fourth inside surface having a first end adjacent to the second end of the third inside surface and a second end, said fourth inside surface defining a fourth inside diameter substantially similar to the second inside diameter;

a third annular shoulder joining the third inside surface with the fourth inside surface;

a fifth inside surface having a first end a first end adjacent to the second end of the fourth inside surface and a second end, said fifth inside surface defining a fifth inside diameter greater than the fourth inside diameter, said fifth inside surface further intersecting said fluid outlet bore;

a fourth annular shoulder joining the fourth inside surface with the fifth inside surface;

a sixth inside surface having a first end adjacent to the second end of the fifth inside surface and a second end at the outlet end of the working bore, said sixth inside surface defining a sixth inside diameter greater than the fifth inside diameter, said sixth inside surface having a means for removably attaching said at least one end plug at the second end of said sixth inside surface; and a fifth annular shoulder joining the fifth inside surface with the sixth inside surface.

5. The apparatus of claim 4 wherein the at least one gauge bore has a second end at the top surface of the fluid end, said second end having a means for removably plugging the at least one gauge bore.

6. The apparatus of claim 4 wherein said first outside surface of said at least one suction/discharge seat further defines a first circumferential groove positioned in the first outside surface;

said third outside surface of said at least one suction/discharge seat further defines a second circumferential groove positioned in the third outside surface;

a first o-ring is positioned in the first circumferential groove;

a second o-ring is positioned in the second circumferential groove; and the longitudinal axis of the suction/discharge seat is coaxial with the longitudinal axis of the working bore.

7. The apparatus of claim 6 wherein the at least one suction valve element stop is substantially can shaped having a longitudinal axis, a bottom end, an open second end, a generally tubular sidewall having an outside surface connecting the bottom end and the second end and an inside surface defining an inside diameter, said bottom end defining a plurality of holes providing a flow path of a fluid from the working bore to the stuffing box, said outside surface defining an outside diameter similar to the second inside diameter of the working bore, and said outside surface coincident with the second inside surface of the working bore, wherein the longitudinal axis of the suction valve element stop is coaxial with the longitudinal axis of the working bore.

8. The apparatus of claim 7 wherein the at least one suction valve element is substantially tubular and further comprises a first end;

a second end;

a generally cylindrical first inside surface having a first end at the first end of the suction valve element and a second end, said first inside surface defining a first inside diameter similar to the outside diameter of said suction spring;

a generally cylindrical second inside surface having a first end adjacent to the second end of the first inside surface and a second end at the second end of the suction valve element, said second inside surface defining an inside diameter smaller than the first inside diameter;

an annular shoulder joining the first inside surface and the second inside surface;

a first generally cylindrical outside surface having a first end at the first end of the suction valve element and a second end, said first outside surface defining a first outside diameter larger than the inside diameter of the suction/discharge seat;

a second generally cylindrical outside surface having a first end, and a second end at the second end of the suction valve element, said second outside surface defining a second outside diameter smaller than the first outside diameter and smaller than the inside diameter of the suction/discharge seat; and a seating surface joining the second end of the first outside surface and the first end of the second outside surface, said seating surface having the characteristic of seating against the suction end of the suction/discharge seat during a forward stroke of said at least one piston, thereby stopping fluid flow from the fluid inlet bore to the inlet end of the working bore;

wherein the first inside diameter is in covering relationship to the outside diameter of the suction spring and the second end of the suction spring is adjacent to the annular shoulder;

wherein the longitudinal axis of the suction valve element is coaxial with the longitudinal axis of the working bore; and wherein the inside surface of the suction valve element stop is in covering relationship with at least a portion of the suction valve element during stoking of the pump.

9. The apparatus of claim 8 wherein the at least one discharge valve element is substantially cylindrical and further comprises a first end;

a second end;

a first generally cylindrical outside surface having a first end at the first end of the discharge valve element and a second end, said first outside surface defining a first outside diameter smaller than the inside diameter of the suction/discharge seat;

a second generally cylindrical outside surface having a first end and a second end, said second outside surface defining a second outside diameter larger than the inside diameter of the suction/discharge seat;

a third generally cylindrical outside surface having a first end adjacent to the second end of the second outside surface and a second end at the second end of the discharge valve element, said third outside surface defining a third outside diameter similar to the inside diameter of the discharge spring;

a seating surface joining the second end of the first outside surface and the first end of the second outside surface, said seating surface having the characteristic of seating against the discharge end of the suction/discharge seat during a backward stroke of said at least one piston, thereby stopping fluid from the suction/discharge seat to the fluid outlet bore; and an annular shoulder joining the second outside surface and the third outside surface;

wherein the inside diameter of the discharge spring is in covering relationship to the third outside diameter and the first end of the discharge spring is adjacent to the annular shoulder; and wherein the longitudinal axis of the discharge valve element is coaxial with the longitudinal axis of the working bore.

10. The apparatus of claim 9 wherein the at least one discharge valve element stop comprises a longitudinal axis;

an open first end;

a second end;

a generally cylindrical first outside surface having a first end at the first end of the discharge valve element stop, said first outside surface defining a first outside diameter;

a generally cylindrical second outside surface having a first end and a second end, said second outside surface defining a second outside diameter greater than the first outside diameter and similar to and coincident with the fifth inside diameter of the working bore, said second outside surface further defining a circumferential groove positioned in the second outside surface;

a generally cylindrical third outside surface having a first end adjacent to the second end of the second outside surface, said third outside surface defining a third outside diameter;

a shoulder joining the second end of the first outside surface and the first end of the second outside surface;

an annular shoulder joining the second outside surface with the third outside surface; and an o-ring positioned in the circumferential groove;

wherein the first end defines a substantially can-shaped cut-out having a closed bottom surface and a generally tubular sidewall having an inside surface connecting the first end and the bottom surface, said inside surface defining an inside diameter substantially greater than the second outside surface of the discharge valve element, wherein the inside surface of the discharge valve element stop cut-out is in coveting relationship with at least a portion of the discharge valve element during stoking of the pump;

wherein said tubular sidewall defines a plurality of holes providing a flow path of a fluid from the working bore to the fluid outlet bore; and wherein the longitudinal axis of the discharge valve element stop is coaxial with the longitudinal axis of the working bore.

11. The apparatus of claim 10 wherein the at least one end plug comprises:

a first end;

a second end;

a first outside surface having a first end at the first end of the end plug and a second end, said first outside surface defining a first outside diameter similar to the sixth inside diameter of the working bore, said first outside surface further defining a means for engagably attaching to the sixth inside surface of the working bore; and a second outside surface having a first end adjacent to the second end of the first outside surface and a second end at the second end of the end plug, said second outside surface defining a second outside diameter smaller than the first outside diameter, said second outside diameter further defining a means for wrench attachment;

wherein the first end defines a substantially can-shaped cut-out having a closed bottom surface and a generally tubular sidewall having an inside surface connecting the first end and the bottom surface, said inside surface defining an inside diameter similar to the third outside surface of the discharge valve element stop, wherein the inside surface of the discharge valve element stop cut-out is coincident with and in covering relationship with the third outside surface of the discharge valve element;

wherein the end plug is movably adjustable within the working bore such that the bottom end of said suction valve element stop is coincident with the first annular shoulder of the working bore, the first end of said suction/discharge seat is coincident with the second end of said suction valve element stop, the first end of said discharge valve element stop is coincident with the second end of the suction/discharge seat, the first end of said end plug is coincident with the annular shoulder of said discharge valve element stop, and the bottom surface of said end plug cut-out is coincident with the second end of said discharge valve element stop; and wherein the longitudinal axis of the end plug is coaxial with the longitudinal axis of the working bore.

12. The apparatus of claim 11, wherein said suction/discharge seat, suction seat, and suction spring can be inserted into/removed from the working bore in a single step.

13. The apparatus of claim 12 wherein said fluid side is rated for 15,000 pounds and 10 gallons/minute;

the at least one suction/discharge seat is about 2.50 inches long and about 1.48 inches in diameter;

the fourth inside diameter of the at least one working bore is about 1.50 inches; and the at least one working bore is about 6.50 inches long.

14. The apparatus of claim 12 wherein the said fluid end is subjected to an autofrettage treatment and the means for removably plugging the at least one gauge bore is an autoclave fitting.

* * * * *